US012067870B2

(12) United States Patent
Weirich

(10) Patent No.: US 12,067,870 B2
(45) Date of Patent: Aug. 20, 2024

(54) INTERACTIVE TRAFFIC SYSTEM, METHOD AND CONTROL DEVICES

(71) Applicant: Matthew David Weirich, Cincinnati, OH (US)

(72) Inventor: Matthew David Weirich, Cincinnati, OH (US)

( * ) Notice: Subject to any disclaimer, the term of this patent is extended or adjusted under 35 U.S.C. 154(b) by 170 days.

(21) Appl. No.: 17/448,889

(22) Filed: Sep. 26, 2021

(65) Prior Publication Data

US 2022/0013009 A1 Jan. 13, 2022

(51) Int. Cl.
*G08G 1/09* (2006.01)

(52) U.S. Cl.
CPC .................................... *G08G 1/09* (2013.01)

(58) Field of Classification Search
CPC .......... G08G 1/09; G08G 1/0116; G08G 1/00; G08G 1/01; G08G 1/0104; G08G 1/0108; G08G 1/0133; G08G 1/048; G08G 1/056; G08G 1/087; G08G 1/095; G08G 1/164; G08G 1/166; G08G 1/096725; G08G 1/0962; G08G 1/0967; G08G 1/096708; G08G 1/096741; G08G 1/096775; G08G 1/096783; G08G 1/096791; G08G 1/096827; G08G 1/096844; G08G 1/163; G08G 1/167; G08G 1/168; E01F 9/40; E01F 11/00; E01F 9/20; E01F 9/30; E01F 9/529; E01F 9/559; E01F 9/582; E01F 9/588; G01C 21/3461; G01C 21/3658; G05D 1/0088; G05D 1/0221; G05D 2201/0213
See application file for complete search history.

(56) References Cited

U.S. PATENT DOCUMENTS 9,702,098 B1 * 7/2017 King ........................ E01F 9/30

FOREIGN PATENT DOCUMENTS

| | | | | |
|---|---|---|---|---|
| CN | 114929967 A * | 8/2022 | ............ | B60W 50/14 |
| DE | 102019110152 B4 * | 8/2021 | ................ | E01F 9/70 |
| JP | 3958999 B2 * | 8/2007 | | |
| WO | WO-2018042398 A1 * | 3/2018 | .............. | E01F 9/615 |

* cited by examiner

*Primary Examiner* — James J Yang
*Assistant Examiner* — Anthony D Afrifa-Kyei
(74) *Attorney, Agent, or Firm* — David M. Weirich

(57) ABSTRACT

A traffic control device system and method for communicating with autonomous and semi-autonomous vehicles. The traffic control device includes a base adapted to be placed on a surface, a body portion joined to the base portion and extending therefrom, and a communication module joined to or integral with the base or body portion. The communication module includes a transmitter adapted to transmit a signal from the traffic control device to one or more autonomous or semi-autonomous vehicles, wherein the signal includes information that can be used by the one or more autonomous or semi-autonomous vehicles to affect or control at least one system of the vehicle.

13 Claims, 2 Drawing Sheets

INTERACTIVE TRAFFIC SYSTEM, METHOD AND CONTROL DEVICES

FIELD OF THE INVENTION

The present invention relates to traffic control devices and systems for connecting traffic control devices with each other and/or other devices, systems or vehicles. More specifically, the present invention relates to traffic control devices that are capable of wireless communication with other systems and devices to provide real time information about road or traffic conditions or other information relevant to drivers, vehicles, emergency and safety personnel, construction workers, government agencies and/or others interested in the information.

BACKGROUND OF THE INVENTION

Traffic control devices such as cones, delineators, markers, barrels, barriers and the like have been widely used for many years to provide information to drivers, pedestrians and others and to provide a means of physically directing, blocking, and/or separating vehicles and people. Although very effective, the currently available traffic control devices have limitations due to the fact that they are merely a physical device. They can provide visual information to those that are within range to see the devices and they can provide a physical barrier function to those that close enough to touch the control devices, but beyond that they provide very little benefit. Further, in order to be seen at relatively long distances and to provide physical barrier capabilities, currently available traffic control devices are generally quite large, heavy and brightly colored. These characteristics present manufacturers and users with significant negatives in terms of manufacturing, storage, shipping, cost, and greater society in terms environmental impact related to the energy and materials needed to manufacture and ship the devices and the amount of plastic created that will eventually end up needing to be disposed of.

As such, it would be desirable to provide an improved traffic control device that is more environmentally sustainable. For example, it would be desirable to provide a traffic control device that is as effective as current traffic control devices, but which is lighter, uses less plastic, has a smaller overall carbon footprint and/or is easier to store and ship.

It would also be desirable to provide an improved traffic control device that can transfer information to other devices. For example, it would be beneficial for the traffic control device to be capable of sending and/or receiving information from other traffic control devices, vehicles, and/or systems. It would be beneficial for the traffic control device to be adapted to communicate with other systems and/or devices wirelessly.

It would also be desirable to provide an improved traffic control system including traffic control devices that are capable of wirelessly communicating with other devices and systems to provide real time and/or historical information to the other devices and systems. The system may include receivers and/or transmitters in, for example, vehicles, portable digital devices such as smartphones and tablets, that are capable of communicating with each other. The system may also include integrated or separate processors that are capable of processing the information that is provided by the traffic control devices and/or other devices and systems with which the traffic control devices are in communication.

It would be desirable to provide a traffic control system including traffic control devices and vehicles that are capable of wirelessly communicating with each other wherein the system also includes a computer processor that is capable of artificial intelligence (e.g. machine learning) and wherein the computer processor can be trained using information from the traffic control devices, portable smart devices and/or vehicles. It would also be desirable if the traffic control system could analyze and/or interpret information provided by the devices connected in the system or other information provided from one or more other sources to provide useful information to users of the system.

It would also be beneficial to provide a method of controlling traffic that includes the use of a traffic control device of the present invention. Specifically, it would be desirable for the method to include the steps of: 1) providing a traffic control device, the traffic control device having a base, a body joined to the base and a communication module joined to the base and/or body, wherein the communication module is adapted to receive transmit signals; 2) providing a vehicle with a signal receiver that is adapted to receive the signals of the traffic control device, wherein the vehicle also includes a signal processor for processing the signals of the traffic control device to obtain information therefrom and wherein the signal processor or a separate processor is adapted to provide executable instructions or a control signal to at least one system of the vehicle; 3) processing the signals from traffic control device to obtain the information; and 4) providing a signal or executable instructions to one or more systems of the vehicle to influence the output of the at least one system of the vehicle.

The invention disclosed herein may provide any one or more of the described or other features and/or benefits and such features and/or benefits may be provided separately or in any desired combination.

SUMMARY OF THE INVENTION

The present invention provides a solution for one or more of the deficiencies of the currently available devices, systems and methods of the prior art as well as other benefits. Specifically, the present invention provides a traffic control device, comprising: a base, the base adapted to be placed on a surface; a body portion joined to the base portion and extending therefrom; and a communication module joined to or integral with the base or body portion, the communication module including a transmitter, the transmitter adapted to transmit a signal from the traffic control device to one or more autonomous or semi-autonomous vehicles, wherein the signal includes information that can be used by the one or more autonomous or semi-autonomous vehicles to affect or control at least one system of the vehicle.

Additionally, the present invention provides a traffic control system, the traffic control system comprising: at least one traffic control device including a signal transmitter adapted to produce a signal including information; at least one vehicle including a signal receiver adapted to receive the signals of the traffic control device; the vehicle also including a processor adapted to process the signals of the traffic control device, the processor programmed to provide an output based on the information included in the signal of the traffic control device.

In addition, the present invention provides a method for controlling traffic, the method including the steps of: providing a traffic control device, the traffic control device having a base, a body joined to the base and a communication module joined to the base and/or body, wherein the communication module is adapted to receive transmit a signal including information; providing a vehicle with a signal receiver that is adapted to receive the signals of the traffic control device, wherein the vehicle also includes a signal processor for processing the signal of the traffic control device to obtain the information therefrom and wherein the signal processor or a separate processor is adapted to provide executable instructions or a control signal to at least one system of the vehicle; processing the information obtained from the signal; and providing executable instructions to one or more systems of the vehicle to affect the output of the at least one system of the vehicle.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown.

The Figures depict preferred aspects for purposes of illustration only. Alternative aspects of the systems and methods illustrated herein may be employed without departing from the principles of the invention described herein.

Figure 1:
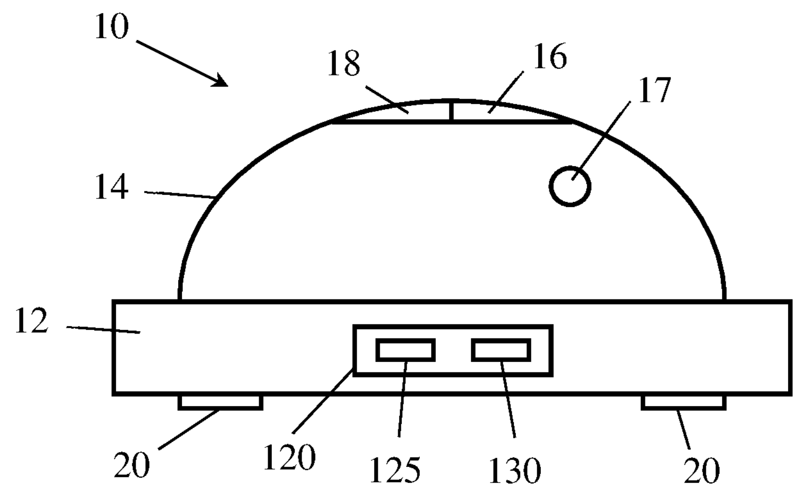

FIG. 1 is a plan view of an example of a traffic control device.

Figure 2:
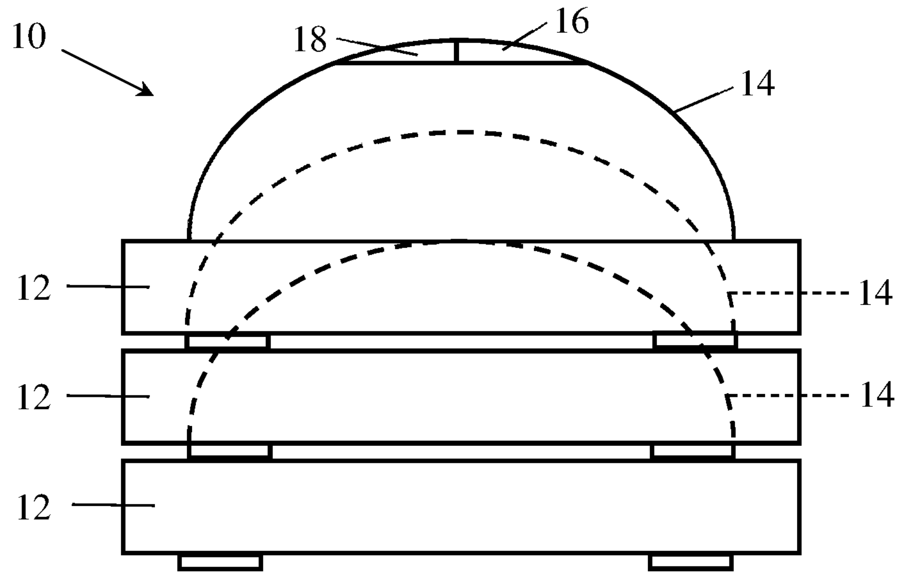

FIG. 2 is an example of several traffic control devices in a stacked configuration.

Figure 3:
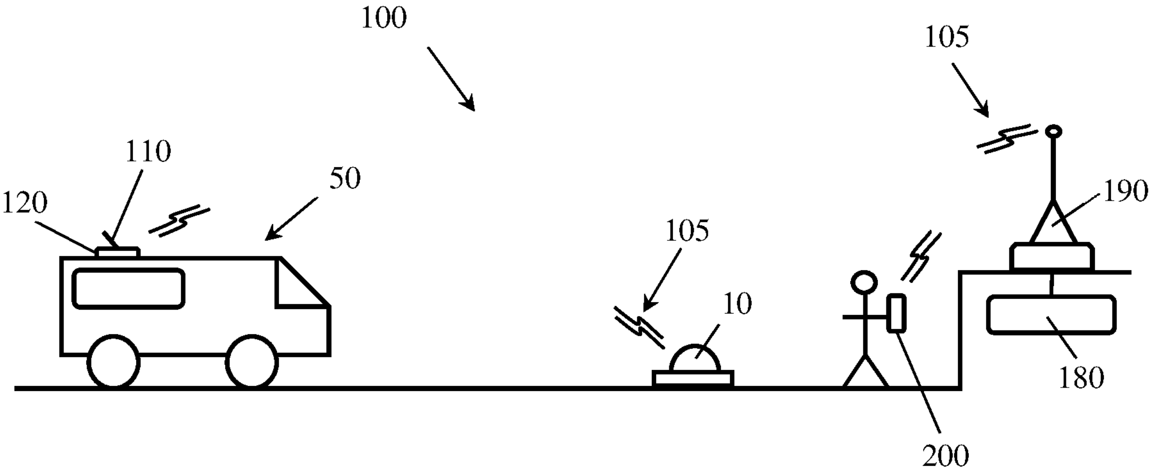

FIG. 3 depicts a simplified traffic control system including the traffic control device of the present invention.

Figure 4:
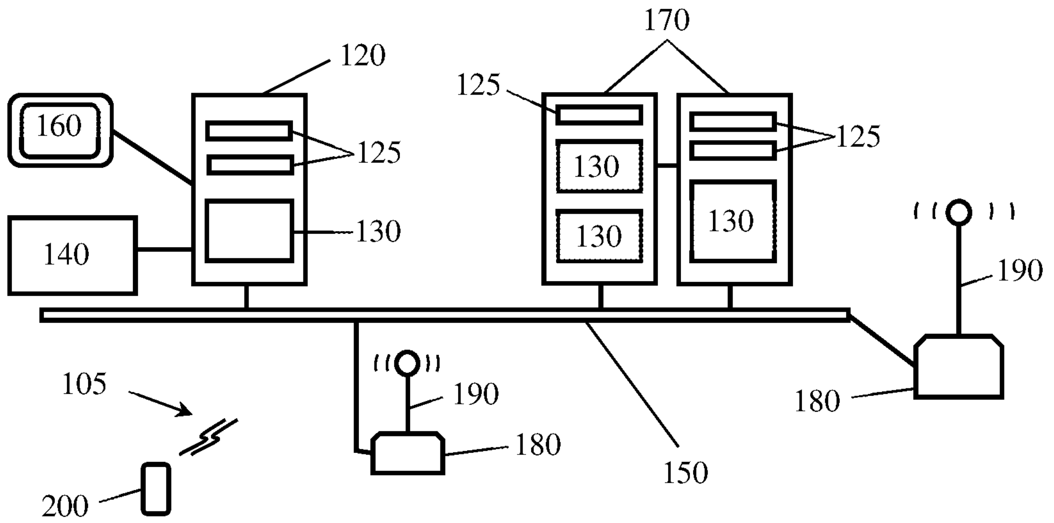

FIG. 4 depicts how different components of a traffic control system may be connected in a network.

DETAILED DESCRIPTION OF THE INVENTION

As noted herein, the present invention is directed to traffic control devices, systems and methods for controlling traffic. More specifically, the present invention is directed to interactive traffic control systems, devices and methods. The following detailed description provides detailed, but non-limiting examples of the invention and different aspects thereof. The examples are not intended to be limiting to the scope of the invention, but rather are intended to help the reader understand aspects of the invention. It should be understood that embodiments beyond the exemplified herein are specifically contemplated and those of skill in the art would understand how to make and use such embodiments based on this detailed description and information that is otherwise publicly available and/or commonly understood by those of skill in the art.

The following definitions are intended to help the reader understand the disclosure.

Definitions

The term "autonomous vehicle" refers to a vehicle that can move from a starting point to a predetermined destination without a human controlling the vehicle. A "semi-autonomous vehicle" is one that requires some human input to travel from its starting point to its predetermined destination, but also is at least partially controlled by some type of computer system, such as, for example, an autopilot.

The term "traffic control device", as used herein, refers to any physical device that is or can be used to influence or control vehicular, pedestrian or other traffic. The term is not intended to be limiting in any way in terms of the physical characteristics of the device (e.g. size, shape, color, materials from which it is made, etc.). Non-limiting examples of traffic control devices are cones, barrels, markers, delineators, barriers, fences, etc.

The term "joined to" is used herein to indicate that two or more items or elements are operatively associated with each other. The term includes situations where two or more items or elements are directly joined to each other, indirectly joined to each other, and/or integral with each other.

The term "one or more of the following" is used herein to indicate that any individual item from the relevant list can be used for the described purpose alone or in combination with any other item of the list. The term is not intended to be limiting in any way with respect to the number of the same or different items that can be combined. Further, unless specifically indicated, the term is not intended to limit embodiments to those that include only elements of the list. That is, unless otherwise indicated, additional elements can be combined with the items of the list.

The term "vehicle" as used herein means any type of machine that itself moves and is used to move itself, people or cargo from one location to another. The term is not intended to be limiting to any type of vehicle and includes machines that move on or over the land, in or over water, in air or in space. The vehicle may be powered by an engine, a motor, a rocket, wind, a human, an animal or any other power source or may be pulled, pushed or otherwise moved by another vehicle or machine. Non-limiting examples of vehicles include, but are not limited to automobiles, motorcycles, bicycles, boats, airplanes, spaceships, trucks, trains, carts, hovercraft, tricycles, and the like.

The term "mesh network" as used herein refers to a local network created by communication between two or more objects (i.e. "nodes").

Traffic Control Device:

The traffic control device of the present invention may be of any size or shape, may be any desired color, and may be made from any desired material or materials. However, the traffic control device will typically include a base, a body portion joined with or integral to the base portion and a communication module joined to or integral with the base and/or body portion, which are described in more detail below and are depicted in the Figures. The communication module is preferably adapted to send and/or receive information to a secondary communication device that is external to the traffic control device, such as, for example, a receiver in a vehicle, building or portable device.

The traffic control device may take on the shape and size of currently available traffic control devices, such as, for example, traffic cones, delineators, markers, barrels, barriers and the like. Often, traffic control devices are brightly colored (e.g. orange, yellow, red, etc.) so they can be easily seen by drivers of vehicles and pedestrians. Also, traffic control devices such as, for example, cones, barrels and delineators often include at least a portion that is reflective of light that is produced by automobile headlights to allow them to be more easily seen in dark and other low-visibility situations. Although the traffic control device of the present invention can be the size, shape and color of currently available traffic control devices, it need not be so. In fact, that is one advantage of the traffic control device of the present invention. Because it includes a communication module that is capable of communicating with other systems and/or devices, it need not necessarily be the size, shape and color of currently used traffic control devices. This allows flexibility in the design of the traffic control device and allows, if desired, for a reduction in the amount of material used for each device. This is due to the fact that the traffic control device does not necessarily need to be visible to a human under a wide range of conditions or the need for the device to provide a physical barrier. It also allows for the traffic control devices to be made of different materials, such as lighter weight materials, if desired. In addition, because the traffic control devices need not necessarily be brightly colored, the traffic control devices of the present invention allow for more flexibility in the visual aspects and aesthetics of the device.

FIG. 1 illustrates an example of a traffic control device 10 of the present invention. The traffic control device 10 includes a base 12 and a body portion 14 joined thereto or integral therewith. The base 12 may adapted to be permanently or removably placed on a surface, such as, for example, a road surface, a walkway, or the like or may be adapted, for example, to float on water, or may be adapted to be joined, temporarily or permanently, to a support device, such as, for example, a pole, a rope, a wire, a stand, etc. The traffic control device 10 preferably also includes a communication module 16 joined with one or both of the base 12 or body 14. The traffic control device 10 may include one or more input modules 17, such as, for example, a camera, a laser, radar, a microphone, an electromagnetic sensor, a vibration sensor, a thermometer, a light sensor, a humidity sensor, a pollution sensor or a touch sensor, or one or more other sensors. The input module(s) 17 can be configured to receive or capture information that can be used or processed by the traffic control device 10, or that is transmitted to other devices, vehicles or users, etc.

The base 12 of the traffic control device may be made of any desired material and may be of any desired size or shape. In one example, the base 12 is a flat cylinder or disc (e.g. hockey puck shape) and is made of recycled rubber. The base 12 may be weighed with a heady material like a metal or may include one or more fasteners 20 that are adapted to fasten the base 12 to a surface or support device. Of course, other shapes and sizes are possible, but one example is a disc that is from about 2 cm to about 200 cm in diameter and from about 1 mm to about 100 mm thick. The base 12 may be any color and for example, may match the color of the surface on which it will be placed or may be a contrast thereto. The traffic control device 10 may be disposable, reusable or recyclable.

The body 14 of the traffic control device 10 may be made of any desired material and may be of any desired size or shape. In one example, as shown in FIG. 1, the body 14 is generally the shape of a spherical cap and is made of a recycled plastic material. The body 14 may be solid or hollow and may be any desired color or colors. Of course, other shapes and sizes are possible, but one example is a cone that is from about 2 cm to about 200 cm in diameter at its largest diameter and from about 1 cm to about 500 cm tall. In another example, the body 14 is flat and relatively planar (e.g. a rectangular parallelepiped) and may be similar in size and shape to a deck of cards. The body 14 may be any color and for example, may match the color of the base 12 or may be contrasting thereto. If desired, all or a portion of the body 14 may be brightly colored and/or reflective of light. The body 14 may be integral with the base 12 or directly or indirectly joined to the base 12 and may be permanently or detachably joined thereto.

The traffic control device 10 may be shaped and configured such that it can be easily stacked with other similarly sized and shaped traffic control devices 10. For example, it may be desirable that two or more traffic control devices 10 are at least partially nested when stacked. That is, the traffic control devices 10 can be placed one on top of the other in a volume-efficient manner so as to be easily stored and transported. An example of articles that are at least partially nested when stacked upon one another are traffic cones where at least a portion of each cone can is disposed inside another cone when stacked. FIG. 2 shows how the traffic control device 10 shown in FIG. 1, the body 14 can take on a convex spherical cap shape and the base 12 can have a corresponding concave shape or can be a ring shape with a center hole through which at least a portion of the convex body 14 of another traffic control device 10 can protrude when they are stacked on top of each other. Such a nested configuration may be desired for easy transportation and storage of the traffic control devices 10, especially if large numbers of the traffic control devices 10 are transported or stored together.

As noted above, the traffic control device 10 includes a communication module, such as communication module 16. The communication module 16 may be adapted to receive and/or transmit signals to communicate with other objects or devices. For example, the communication module 16 may include a transmitter or receiver of one or more types of signals, including but not limited to light, sound, radio waves, electromagnetic waves, etc. The signals may be analog or digital or a mix thereof and may be in accordance with standards such as, for example IEEE, 3GPP, 02.11a/b/c/g (WIFI), BLUETOOTH, 5G or other standards that are now know of may be in the future invented and/or adopted. The communication module 16 may operate actively or passively or both. An active communication module 16 has a power source 18 that powers the communication module 16 to enable it to send and/or receive a signal. Examples of power sources include, but are not limited to batteries, AC or DC electric, gas power generators, wind power generators, solar power generators, or any other suitable source of power. A non-limiting example of a communication module 16 that acts passively is one that uses RFID to communicate with another device. As such, a passive communication module 16 may not need a power source 18. A communications module 16 that is both active and passive may include different types of signal generators or a single signal generator that can be activated by energy from an attached power source 16 or by signals from another device (e.g. RFID).

The communication module 16 is preferably adapted to communicate with one or more objects or devices, either via wire or wirelessly by some sort of signal. As noted above, the signal can be any type that is desired and may include one or more of the following: light, sound, electromagnetic waves such as radio waves, or any other suitable signal. The communication module 16 of the traffic control device 10 may communicate with other traffic control devices 10 as well as other types of devices used in traffic control systems (e.g. traffic lights) and may communicate with vehicles, people, computers, mobile devices such as cell phones, smartphones or tablets, emergency personnel, construction workers, government agencies, law enforcement, safety personnel, etc. In preferred embodiments, the traffic control device 10 has a communication module 16 that is configured to communicate with autonomous or semi-autonomous vehicles. In especially preferred embodiments, the traffic control device 10 of the present invention is configured to transmit a signal including information that can be used to affect or control one or more systems of the vehicle.

The traffic control device 10 may include or be operatively associated with a computer 120, as shown in FIG. 3, that is capable of processing information. As used herein, the term "computer" is not intended to limit the specific type of device that can used to process the information, but rather is intended to encompass all known types of devices used for that purpose. The computer 120 may include or be operatively associated with one or more processors 125 and/or may include or a memory 130. The memory 130 may include data or executable instructions (e.g. software) that can be used to control the processors 125, the communication module 16, and/or the power source 18. More details and non-limiting examples of computers, processors and memory are set forth below in the description of the traffic control system 100. The entirety of the description, details and examples set forth therein is intended to be considered relevant to and part of the disclosure of similar elements and aspects of the traffic control device 10 itself, whether stand alone or part of a traffic control system, such as traffic control system 100 described below.

Traffic Control System:

The traffic control device 10 may be part of a traffic control system. A non-limiting example of a traffic control system is shown in FIG. 3 as traffic control system 100. Traffic control system 100 includes at least one traffic control device 10 and at least one traffic control receiver 110. As shown in the figure, the traffic control receiver 110 is operatively associated with a vehicle 50. The traffic control receiver 110 may be fixed to a vehicle 50 or may be a portable device that can be temporarily associated with a vehicle 50. In some configurations, the traffic control receiver 110 will be used by a pedestrian or other user that is not necessarily associated with a vehicle. The traffic control receiver 110 is configured to receive signals 105 from the traffic control device 10. Preferably, the traffic control receiver 110 is operatively associated with at least one device, such as, for example a computer 120, that can process the received signals 105 from the traffic control device 10.

If a computer 120 is used, a computer program, application, code, or other computing instructions may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by a processor (e.g., working in connection with the respective operating system in one or more memories) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The computer 120 or other device used to process the signals 105 from the traffic control device 10 may include one or more processors 125 and, if desired, a memory 130. The memory 130 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 130 may store an operating system (OS) (e.g., Microsoft Windows, Linux, UNIX, etc.) capable of facilitating the functionalities, apps, methods, or other software as discussed herein. In addition, the memory 130 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an AI based machine learning model or component, such as the AI based learning model. It should be appreciated that one or more other applications may be envisioned and that are executed by the processor(s) 125.

The processor(s) 125 may be connected to the memory 130 via a computer bus responsible for transmitting electronic data, data packets, or otherwise electronic signals to and from the processor(s) 125 and memories 130 in order to implement or perform the machine-readable instructions, methods, processes, elements or limitations, as illustrated, depicted, or described for the various flowcharts, illustrations, diagrams, figures, and/or other disclosure herein.

Processor(s) 125 may interface with memory 130 via the computer bus to execute an operating system (OS). Processor(s) 125 may also interface with the memory 130 via the computer bus to create, read, update, delete, or otherwise access or interact with the data stored in memories 130 and/or a database 140 (e.g., a relational database, such as Oracle, DB2, MySQL, or a NoSQL based database, such as MongoDB). The data stored in memories 130 and/or database 140 may include all or part of any of the data or information described herein, including, for example, training data (e.g., as collected by user computing devices); images and/or user images or as otherwise described herein.

The computer 120 may be configured to communicate (e.g., send and receive) data via one or more external/network port(s) to one or more networks, local terminals or servers, such as computer network 150, terminal 160 and/or server(s) 170. In some aspects, the server(s) 170 may include a client-server platform technology such as ASP.net, Java J2EE, Ruby on Rails, Node.js, a web service or online API, responsive for receiving and responding to electronic requests. The server(s) 170 may implement the client-server platform technology that may interact, via the computer bus, with the memory 130 (including the applications(s), component(s), API(s), data, etc. stored therein) and/or database 140 to implement or perform the machine-readable instructions, methods, processes, elements or limitations, as illustrated, depicted, or described for the various flowcharts, illustrations, diagrams, figures, and/or other disclosure herein.

Server(s) 170 may comprise multiple servers, which may comprise multiple, redundant, or replicated servers as part of a server farm. In still further aspects, server(s) 170 may be implemented as cloud-based servers, such as a cloud-based computing platform. For example, server(s) 170 may be any one or more cloud-based platform(s) such as MICROSOFT AZURE, AMAZON AWS, or the like. Server(s) 170 may include one or more processor(s) 125 and one or more computer memories 130.

In various aspects, the server(s) 170 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 150. In some aspects, computer network 150 may comprise a private network, local area network (LAN) or may be part of a mesh network. Additionally, or alternatively, computer network 150 may be part of a public network such as the Internet.

The computer 120 may further include or implement an operator interface configured to present information to an administrator or operator and/or receive inputs from the administrator or operator. An operator interface may provide a display screen (e.g., via a terminal). The computer 120 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to a terminal 160. According to some aspects, an administrator or operator may access the computer 120 via a terminal 160 to review information, make changes, input training data or images, initiate training of an AI based learning model, and/or perform other functions.

The traffic control device 10, computer 120 and servers 170 may together or separately perform the functionalities as discussed herein as part of a "cloud" network or may otherwise communicate with other hardware or software components within the cloud to send, retrieve, or otherwise analyze data or information described herein.

As shown in FIG. 4, components of the traffic control system 100 may be communicatively connected, via computer network 150 via cellular base stations 180, such as cell towers 190, communicating wirelessly based on any one or more of various mobile phone standards, including NMT, GSM, CDMA, UMMTS, LTE, 5G, or the like. Additionally, or alternatively, base stations 180 may comprise routers, wireless switches, or other such wireless connection points capable of communicating via wireless communications based on any one or more of various wireless standards, including by non-limiting example, IEEE 802.11a/b/c/g (WIFI), the BLUETOOTH standard, or the like.

The traffic control system 100 may also include one or more user computing device 200. User computing devices 200 may comprise mobile devices and/or client devices for accessing and/or communications with the servers 170, traffic control devices 10 and/or computer 120. Such client devices may comprise one or more mobile processor(s) and/or an imaging device for capturing images. In various aspects, user computing device 200 may comprise a mobile phone (e.g., a cellular phone), a tablet device, a personal data assistance (PDA), or the like, including, by non-limiting example, an APPLE iPhone or iPad device or a GOOGLE ANDROID based mobile phone or table.

In a typical usage scenario, the traffic control device 10 of the present invention would be located on a street that is traversed by vehicles 50. The vehicles 50 could be autonomous vehicles or semi-autonomous vehicles and include a receiver for receiving signals from the traffic control device 10. One or more of the traffic control devices 10 could be placed along a portion of the street that, for example, is under construction. The traffic control device(s) 10 could be programmed to send communication signals to passing vehicles 50 to alert the human driver of the vehicle 50 to the construction, for example via a visual or audible output on a system of the vehicle 50 or on a mobile device, such as a smartphone. Alternatively, or in addition, the vehicle 50 may include a control system that allows a computer 120 to control one or more features of the vehicle 50, such as, for example, speed, direction, braking, navigation, etc. The signal 105 from the traffic control device 10 can thus be used to directly control the vehicle 50 in some way. In this example, the signal 105 from the traffic control device 10 may cause the display of the vehicle 50 to indicate the vehicle 50 is in or close to a construction zone and automatically reduce the speed of the vehicle 50. The signal 105 from the traffic control device 10 could also cause the vehicle 50 to brake, change direction or calculate an alternative navigation route. The above are just a few non-limiting examples of how the traffic control device 10 of the present invention may be used with vehicles 50 like automobiles. Many other scenarios are contemplated for use of the traffic control device 10 of the present invention with other vehicles and non-vehicular use, such as, for example with pedestrians having mobile devices such as portable computers, tablets or smartphones.

The traffic control device 10 of the present invention may be used alone (e.g a single traffic control device 10) or may be used in conjunction with one or more other traffic control devices 10 or other devices such as traffic signs, traffic signals, etc. If more than one traffic control device 10 is used or if the traffic control device 10 is used with other devices, the devices may be wired together or may communicate wirelessly. In one example, several traffic control devices 10 may wirelessly communicate with each other to form a mesh network. The one or more traffic control devices 10 may also connect to the Internet or another network to allow communication beyond just the traffic control device 10 network.

The traffic control device(s) 10 of the present invention may be part of a traffic control system 100 that uses real-time, historical or dynamic information to provide information to users. For example, the traffic control device 10 may include one or more input module, such as, for example, a camera, a laser, radar, a microphone, an electromagnetic sensor, a vibration sensor, a thermometer, a light sensor, a humidity sensor, a pollution sensor or a touch sensor, or one or more other sensors to capture information that can be used to inform the system 100. One example would be where the traffic control device 10 includes a radar input module that can be used to determine the speed of close vehicles. The information about the speed of the vehicles can be used by the traffic control device 10 to determine the information that will be provided in the output signal 105 from the traffic control device 10 or may be transmitted as raw data to another device (e.g. traffic control system 100 or vehicle 50) that can then use the information as desired.

The traffic control device 10 of the present invention may also receive information from other devices, for example vehicles, pedestrians, traffic cameras, construction personnel, safety officers, etc., and use or transmit that information to other devices. For example, the traffic control device 10 may be configured to receive navigation information from passing by vehicles. The traffic control device 10 may then use the information to determine the output signal it is sending or may pass the information along to other devices that can use the information as input data. An example would be where the traffic control device 10 receives information from one or more passing vehicles about their intended navigation route. The information is then passed to a traffic control system 100 that uses the information to help predict the volume of traffic at certain locations at certain times. The information can be used, for example, to influence traffic signals, open or close traffic lanes, inform emergency personnel, re-route traffic, etc.

In yet another example, the information received by or provided to one or more traffic control devices 10 may be passed to other traffic control devices 10 and then to other users within the system 100. For example, one traffic control device 10 may receive (e.g. as a signal from a vehicle) or detect information about a vehicle driving slowly at a certain location. That information can be passed from the receiving traffic control device 10 to another traffic control device 10 and then to one or more vehicles that is traveling being the slow-driving vehicle. The information can be used to slow the trailing vehicles to a safe speed or to provide some type of output to the driver to inform the driver of the speed of the vehicle ahead.

Traffic Control Method

Another aspect of the present invention is a method for controlling traffic. The method may include the step of providing a traffic control device like the traffic control device 10 described herein. The traffic control device 10 may have a base 12, a body 14 joined to the base 12 and a communication module 16 joined to the base 12 and/or body 14. The communication module 16 may be adapted to receive transmit signals 105. The method further includes providing a vehicle 50 with a signal receiver that is adapted to receive the signals 105 of the traffic control device 10. The vehicle 50 preferably also includes a signal processor 125 for processing the signals 105 of the traffic control device 105 to obtain information therefrom. The signal processor 125 is adapted to provide executable instructions or a control signal to at least one system of the vehicle 50. For example, the signal processor 125 may take the information received from the signal 105 and compare it to information stored on its memory or in a database and then determine an action based on the signal 105. In one non-limiting example, the signal 105 includes information about a road hazard. The processor 125 analyses the information and determines that it is best to slow the vehicle 50 down to a predetermined speed. The processor 125 uses the information to provide executable instructions to a control device, such as, for example, a servo, that acts on the executable instructions to reduce then speed of the vehicle 50. Of course, the processor 125 may provide any number of different outputs and may directly or indirectly control the vehicle 50 one or more of its mechanical or electronic systems.

Many other situations where the device, system and method of the present invention would be useful and desirable are contemplated. And, while particular examples of the present invention have been illustrated and described, the examples are not intended to be exhaustive, and it would be obvious to those skilled in the art that various other changes and modifications can be made without departing from the spirit and scope of the invention. It is therefore intended to cover in the appended claims all such changes and modifications that are within the scope of this invention.

What is claimed is:

1. A reusable and portable traffic control device, comprising:

a base, the base adapted to be placed on a surface and having the shape of a disc with an opening therein;

a body portion joined to the base portion and having the shape of a hemisphere extending therefrom and covering the opening of the base, wherein the body and base are shaped to allow the traffic control device to receive at least a portion of another traffic control device therein when in a stacked configuration;

an input module including at least a camera and one or more of the following: a laser, radar, a microphone, an electromagnetic sensor, a vibration sensor, a thermometer, a light sensor, a humidity sensor, a pollution sensor and a touch sensor;

a communication module joined to or integral with the base or body portion, the communication module including a transmitter, the transmitter adapted to transmit a signal from the traffic control device to one or more autonomous or semi-autonomous vehicles and one or more traffic lights; and a computer having at least one processor trained using an Artificial Intelligence (AI) based learning model using information obtained from the input module, wherein the computer is adapted to communicate with the communication module and is programmed with instructions to direct the communication module to transmit information in the form of a radio signal to the one or more autonomous or semi-autonomous vehicles, and wherein the information transmitted in the signal includes output from the input module information trained processor and includes at least predicted traffic conditions based on intended route information obtained from passing vehicles, warning information, and mapping recommendations, and wherein the signal includes information and is in a format adapted to cause a video or audible output in a human driven vehicle and to control at least one system of autonomous or semi-autonomous vehicles, and wherein the computer is also programmed with instructions to direct the communication module to transmit information in the form of a radio signal to the one or more traffic lights so as to influence the operation of the traffic lights based on the intended route information obtained from the passing vehicles.

2. The traffic control device of claim 1 wherein at least a portion of the body portion includes a reflective material.

3. The traffic control device of claim 1 wherein the radio signal transmitter and/or receiver uses WiFi and/or Bluetooth.

4. The traffic control device of claim 1 further including a power source.

5. The traffic control device of claim 4, wherein the power source includes one or more of the following: a battery, an AC power source, a solar power source, and a wind power source.

6. The traffic control device of claim 1 wherein the communication module includes networking infrastructure adapted to allow the traffic control device to create or be part of a mesh network.

7. A traffic control system, the traffic control system comprising:

at least one traffic control device of claim 1; and at least one vehicle including a signal receiver adapted to receive the signals of the traffic control device; the vehicle also including a processor adapted to process the signals of the traffic control device, the processor programmed to provide an output based on the information included in the signal of the traffic control device.

8. The traffic control system of claim 7 wherein the vehicle includes a control system and the output of the processor of the vehicle includes instructions to the control system.

9. The traffic control system of claim 8 wherein the instructions to the control system of the vehicle cause the vehicle to take one or more of the following actions: speed up, slow down, stop, turn, reverse, take an alternate route, turn on lights, turn off lights, turn on windshield wipers, turn off windshield wipers, open a door, lock a door, adjust a restraining system, turn on climate control, turn off climate control, adjust climate control, turn on hazard lights, turn off hazard lights, turn on turn signal, turn off turn signal, turn on radio, turn off radio, turn on video display, turn off video display, connect with smart device, or contact emergency personnel.

10. A method for controlling traffic, the method including the steps of:

1) providing the traffic control device of claim 1;
2) providing a vehicle with a signal receiver that is adapted to receive the signals of the traffic control device, wherein the vehicle also includes a signal processor for processing the signal of the traffic control device to obtain the information therefrom and wherein the signal processor or a separate processor is adapted to provide executable instructions or a control signal to at least one system of the vehicle;
3) processing the information obtained from the signal;
4) providing executable instructions to one or more systems of the vehicle to effect the output of the at least one system of the vehicle; and
5) providing one or more traffic lights with a signal receiver that is adapted to receive the signals of the traffic control device, wherein the signals influence the operation of the one or more traffic lights.

11. The method of claim 10 wherein the at least one system of the vehicle includes one or more of the following: a visual display, a braking system, an acceleration system, a steering system, a mapping system, a lighting system, or a restraining system.

12. A disposable traffic control device, comprising:

a base, the base adapted to be placed on a surface, the base consisting of a recyclable plastic material;

a body portion joined to the base portion and extending therefrom wherein the body and base are shaped to allow the traffic control device to receive at least a portion of another traffic control device therein when in a stacked configuration, the body portion made exclusively from the same recyclable plastic material of the base;

an input module removably joined to the base or body portion including at least a camera, a laser, a light sensor and a thermometer and optionally one or more of the following: radar, a microphone, an electromagnetic sensor, a vibration sensor, a humidity sensor, a pollution sensor and a touch sensor;

a communication module removably joined to the base or body portion, the communication module including a transmitter, the transmitter adapted to transmit a signal from the traffic control device to one or more autonomous or semi-autonomous vehicles; and a computer removably joined to the base or body portion having at least one processor trained using an Artificial Intelligence (AI) based learning module using information obtained from the camera, a laser, a light sensor and thermometer of the input module, wherein the computer is adapted to communicate with the communication module and is programmed with instructions to direct the communication module to transmit information in the form of a radio signal to the one or more autonomous or semi-autonomous vehicles, and wherein the information transmitted in the signal includes output from the input module information trained processor and includes at least predicted traffic conditions based on intended route information obtained from passing vehicles, warning information, and mapping recommendations, and wherein the signal includes information and is in a format adapted to cause a video or audible output in a human driven vehicle and to control at least one system of autonomous or semi-autonomous vehicles.

13. A reusable and portable traffic control device, comprising:

a base, the base adapted to be placed on a surface;

a body portion joined to the base portion and extending therefrom wherein the body and base are shaped to allow the traffic control device to receive at least a portion of another traffic control device therein when in a stacked configuration;

an input module including at least a camera, a laser, radar, a microphone, an electromagnetic sensor, a vibration sensor, a thermometer, a light sensor, a humidity sensor, a pollution sensor and a touch sensor;

a communication module joined to or integral with the base or body portion, the communication module including a transmitter, the transmitter adapted to transmit a signal from the traffic control device to one or more autonomous or semi-autonomous vehicles; and a computer having at least one processor trained using an Artificial Intelligence (AI) based learning module using information obtained from each of the camera, laser, radar, microphone, electromagnetic sensor, vibration sensor, thermometer, light sensor, humidity sensor, and a touch sensor of the input module, wherein the computer is adapted to communicate with the communication module and is programmed with instructions to direct the communication module to transmit information in the form of a radio signal to the one or more autonomous or semi-autonomous vehicles, and wherein the information transmitted in the signal includes output from the input module information trained processor and includes at least predicted traffic conditions based on intended route information obtained from passing vehicles, and wherein the signal includes information and is in a format adapted to cause a video or audible output in a human driven vehicle and to control at least the mapping system, the braking system and steering system of an autonomous or semi-autonomous vehicle.

* * * * *